Sept. 13, 1932.  F. M. CLARK  1,877,644
METHOD OF IMPREGNATING ELECTRICAL DEVICES
Filed April 25, 1929
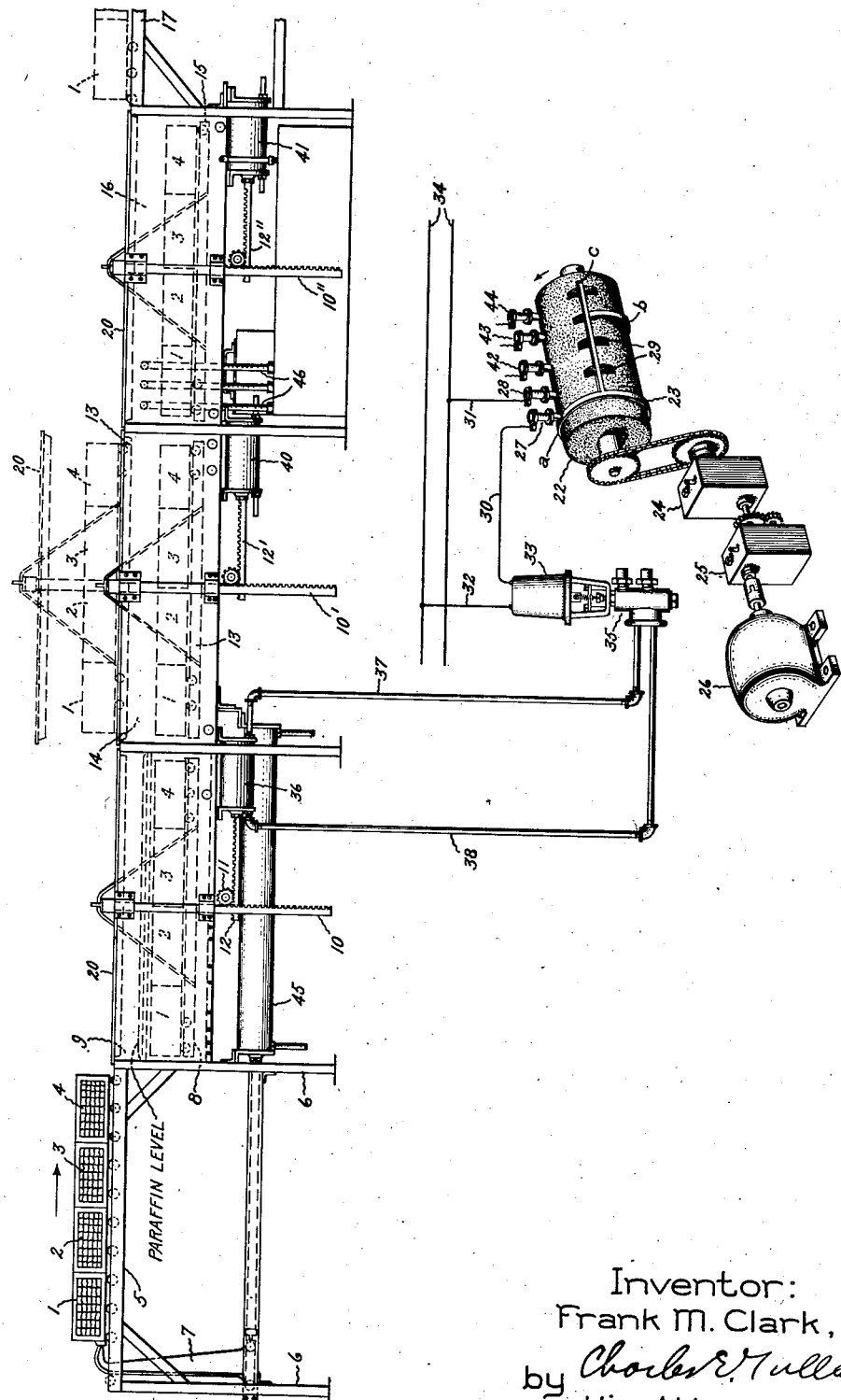
Inventor:
Frank M. Clark,
by Charles E. Muller
His Attorney.

Patented Sept. 13, 1932

1,877,644

UNITED STATES PATENT OFFICE

FRANK M. CLARK, OF PITTSFIELD, MASSACHUSETTS, ASSIGNOR TO GENERAL ELECTRIC COMPANY, A CORPORATION OF NEW YORK

METHOD OF IMPREGNATING ELECTRICAL DEVICES

Application filed April 25, 1929. Serial No. 358,109.

The present invention comprises an improved method of treating electric capacitors, transformers, cables or other electrical devices with dielectric material, for example, mineral wax or oil.

In accordance with my invention the introduction of dielectric into the electrical device is carried out by successive contact of the device: First, with a highly heated dielectric, and then, with a dielectric at a lower temperature. In the high temperature bath, which ordinarily is above 150° C., moisture and other volatile materials are removed, and in the lower temperature bath, the treated device is cooled while sealed to exclude air.

My invention is particularly applicable to the impregnation of capacitors which are provided with dielectric material consisting of paper, or other cellulosic material, but is of general applicability to electrical devices, and to other forms of dielectric materials.

The novel features of my invention will be set forth in greater detail in the following specification taken in connection with the accompanying drawing.

The drawing illustrates in side elevation one form of apparatus whereby my invention may be carried into effect.

The apparatus illustrated in the drawing comprises a series of impregnating tanks, in one of which a suitable dielectric material may be maintained at a desired high temperature, one or more other tanks being provided with suitable media at a lower temperature, and means being provided for carrying the capacitors, or other devices, through such media in succession.

Referring to the drawing, containers or baskets 1 to 4, loaded with electric capacitors to be treated, are first placed on a loading platform 5 which is mounted on supports 6. From this platform the capacitors are transferred by an arm 7 to a vertically movable holder 8 which is arranged to be lowered, so as to cause the unimpregnated capacitors to be immersed in the bath of highly heated impregnating material contained in a tank 9. Mineral wax, such as paraffin or halowax, or a mineral oil preferably are used. Dielectric materials of organic origin also may be employed. The holder 8 is mounted on a geared rod 10 which engages with a gear drive 11, the latter engaging with a geared horizontally reciprocating rod 12. When the holder 8 is lowered the capacitors are plunged into the highly heated bath of dielectric where they remain for a sufficient length of time to thoroughly boil out moisture and gases. The arm 7 and the geared rod 12 are actuated by hydraulic devices which will be explained presently.

The bath in the tank 9 in general should be materially above the boiling point of water, and preferably should be maintained above 150° C. In the case of a bath of mineral wax a temperature approximating 170° C. is desirable. The capacitors are caused to remain in contact with this highly heated bath for about two to four hours and then are transferred quickly to a holder 13, for example, by being pushed by another set of entering baskets. The holder 13 is arranged to quickly lower the baskets containing the capacitors leaving the tank 9 into a tank 14 which contains a quantity of dielectric at a lower temperature. This second treating agent may be of the same nature as in the first stage of the process, but the use of other agents is not excluded. When a normally solid dielectric is employed, the second bath should be at a temperature slightly higher than the melting point of such dielectric. In the case of mineral wax this second bath may be heated to about 80 to 90° C.

After remaining in the tank 14 for several hours, or until the temperature of the impregnated device is lowered to the temperature of the second bath, the capacitors are transferred quickly to a holder 15, which either transfers them to a tank 16 containing a liquid dielectric, for example, mineral oil, which is maintained at a still lower temperature, say, at room temperature, or permits them to cool in air or other gas. The capacitors may remain for an extended period, say, for about one hour, in the oil in order to cool down throughout to room temperature. They then are drained and finally transferred to an unloading platform 17, which is shown in the drawing partly broken away.

The mechanism whereby the above operations may be carried out automatically is not an essential part of my invention as the procedure may be carried out by hand. Its operation in greater detail is as follows: Assuming each of the holders within the various tanks to contain a set of baskets filled with capacitors, as indicated in dotted lines, and the loading platform 5 to contain a set of baskets containing capacitors to be impregnated, the first step in its operation, as above explained, consists in the movement of each of the holders 8, 13 and 15 to their upper position at the respective impregnating tanks, as indicated in dotted lines in connection with the tank 14. The holder 13 moves flush with the rim of the tank, the cover 20 being lifted in each case (as indicated in dotted lines) by the upward movement of the geared rod 10'. This upward movement is brought about by an automatic electric control mechanism, one element of which is illustrated in the drawing.

The control mechanism comprises a drum 22 provided with an electric contact strip 23 (later described) and driven through suitable speed-reducing gearing 24 and 25 by an electric motor 26. The gearing is in such ratio to the speed of the motor, that the drum 22 makes one complete revolution in about four hours. The contactor strip 23 on the drum consists of two circular members $a$ and $b$ and a rectilineal member $c$. A contactor 27 engages, continually during the revolution of the drum, with the strip $a$, and a contactor 28 engages, during a short fraction of the revolution of the drum, say for about 1½ minutes, with the rectilineal strip $c$. An insulating segment 29 is provided to cause the contactor 28 to be raised to the level of the conducting member $c$ from the contour of the non-conducting cylinder and after making contact with the strip $c$ to descend again to the contour of the cylinder. During the revolution of the cylinder 22, a circuit is established by the contactors 27 and 28 through the conductors 30, 31 and 32 to energize a relay 33 with current taken from lines 34. By the operation of the relay 33 a valve mechanism 35 is actuated to supply a fluid, such as water, under pressure to the hydraulic cylinder 36 by the pipe 37. A pipe 38 is provided for the discharge of water from the cylinder 36. Similar contact making drums and valve outfits (not shown) are provided for operating the hydraulic cylinders 40 and 41 which are connected in a similar manner to the geared rods 12' and 12" for operating vertically reciprocating rods 10' and 10" in the impregnating tanks 14 and 16. The contactors which complete the circuit in the controlled mechanism of these tanks are shown at 42 and 43, but the accompanying circuits and mechanism has been omitted for the sake of rendering the drawing less complicated. The contact element $b$, which cooperates with the contactor 43, permits the circuit which controls the operation of the cylinder 41 to remain closed for a longer time than the circuits controlling the hydraulic cylinders 36 and 40, so as to cause the capacitors to remain lifted out of the oil bath for a sufficient length of time to permit the oil to completely drain away from them. As indicated in the drawing, the contact element $b$ is shaped as an arc of a circle so that it remains closed for a length of time equal to about one hour. While each of the contactors 28, 42 and 43 are engaging with the contact element $c$, the circuit of contactor 44 also is closed, thereby actuating hydraulic mechanism for operating the hydraulic cylinder 45 and causing the arm 7 to move to the right, transferring the new set of baskets filled with unimpregnated capacitors to the holder 8 and moving each of the other sets one step forward. The capacitors on the holder 15 from which the oil has drained are transferred to the unloading platform 17. The described procedure is then repeated automatically.

It will be observed that the impregnating interval during which the capacitors are immersed in the dielectric material, is long compared with the transfer interval. The operation of the mechanism, in other words, causes a rapid transfer of the capacitors successively from the high temperature impregnating bath to the successively lower temperature impregnating baths. The second cooling bath, as above stated, may be omitted in some cases, the final cooling in that case taking place in air. For the sake of rendering the drawing less complicated, heating means and other accessories have been omitted. However, pipes 46 for conveying a cooling medium have been indicated in connection with the tank 16.

Electric devices treated in accordance with my invention are capable of operation at higher voltage and are more uniform in their operating characteristics than devices which have been subjected to processes heretofore employed.

What I claim as new and desire to secure by Letters Patent of the United States, is:

1. The method of impregnating a capacitor with a fusible dielectric material which consists in introducing said capacitor into a body of said material which is heated to a temperature of at least 150° C. and materially above its melting point, when the temperature of said capacitor has come to an equilibrium with said heated material quickly transferring said capacitor to another portion of said material which is heated to a temperature of about 80 to 90° C., when the temperature of said capacitor has been lowered in said second portion transferring the same to a dielectric material which is liquid at the congealing point of said fusible material, and cooling said capacitor in said liquid dielectric material to approximately room temperature.

2. The method of impregnating an electric capacitor with hydrocarbon wax which consists in treating said capacitor in a bath of such wax which is heated to a temperature approximating 170° C. for at least about two hours, transferring said capacitor quickly to a bath of such wax which is heated to a temperature of about 80 to 90° C., causing said capacitor to remain in such lower temperature bath for about one hour, thereupon removing said capacitor and cooling to room temperature in a bath of mineral oil.

3. The method of treating an electric capacitor containing a cellulosic dielectric which consists in immersing said capacitor in a bath of liquid dielectric which is at a temperature of about 150 to 170° C. for a period of several hours, transferring said capacitor to a second bath of dielectric material heated to about 80 to 90° C., causing said capacitor to remain in said second bath for a sufficient length of time to lower the temperature of said capacitor to approximately the temperature of said second bath and finally cooling said capacitor in a liquid medium to approximately room temperature.

In witness whereof, I have hereto set my hand this 23rd day of April, 1929.

FRANK M. CLARK.